United States Patent Office 3,234,209
Patented Feb. 8, 1966

3,234,209

PROCESS FOR MAKING IRON HYDROGENATED DEXTRAN

Nicholas A. Floramo, San Juan, Puerto Rico, assignor to Chemicals Incorporated, Luquillo, Puerto Rico, a corporation of Puerto Rico No Drawing. Filed Sept. 13, 1963, Ser. No. 308,642
6 Claims. (Cl. 260—209)

This invention relates to iron hydrogenated dextran and to a process for making the same, and more particularly to an iron hydrogenated dextran having a relatively low toxicity and staining power, and to a process for making such iron hydrogenated dextran at low cost.

My Patent 3,022,221 issued February 20, 1962 described iron hydrogenated dextran. This material has received substantial recognition by both the medical and veterinary professions, and is widely used to treat iron-deficiency anemia in both humans and animals by parenteral injection.

The iron hydrogenated dextran of my Patent 3,022,221 is virtually entirely free from side effects, pain and inflammation at the site of the injection, and the other undesirable attributes possessed by prior preparations for the treatment of iron-deficiency anemia, such as saccharated oxide of iron, and ferric hydroxide dextran complex. Nevertheless, there is some tendency for the iron hydrogenated dextran of my Patent 3,022,221 to stain at the injection site, although this is appreciably less than ferric hydroxide dextran complex preparations. In addition, the relatively low yields of iron hydrogenated dextran product derived by the process of my Patent 3,022,221 have rendered the cost of my iron hydrogenated dextran preparations fairly expensive. Since iron-deficiency anemia is most widespread among the poorer segments of the population, and among countries in which the standard of living is relatively low, this has proved to be a substantial problem. Finally, while my iron hydrogenated dextran of my Patent 3,022,221 possesses a toxicity which compares most favorably with that of ferric hydroxide dextran complexes and of saccharated oxide of iron preparations, yet, of course, it would prove desirable if the toxicity could be lowered.

By way of example in respect to toxicity, as a general rule, commercial saccharated oxide of iron preparations when tested for intravenous toxicity in mice have a $LD_{50}$ value of about 300 mg./kilo. ferric hydroxide-dextran complexes of $LD_{50}$ value in excess of 600 mg./kilo. and the iron hydrogenated dextran preparations of my patent, when sold commercially have a toxicity which is appreciably less than this value. Nevertheless, an intravenous toxicity in mice of $LD_{50}$ of well above 2000 mg./kilo. has not heretofore been attained or even closely approximated with any injectable iron preparation for the treatment of iron-deficiency anemia.

This invention has as an object the provision of an iron hydrogenated dextran possessing a far lower toxicity than any prior iron hydrogenated dextran.

This invention has as yet another object the provision of an iron hydrogenated dextran which may be administered by parenteral injection to treat iron-deficiency anemia with a minimal degree of staining at the site of injection.

This invention has as still another object the provision of a process for producing at relatively low cost superior iron hydrogenated dextran preparations for the treatment of iron-deficiency anemia.

Other objects will appear hereinafter.

The partially-depolymerized dextran which I use as a starting-material is derived from raw dextran obtained according to known methods by growing under carefully controlled conditions of temperature, appropriate organisms, especially Leuconostoc mesenteroides, syn. Beta coccus arabinosaceous in a suitable nutrient medium containing a high proportion of sucrose. It is further known that the highly polymerized raw dextran gives rise on partial degradation as, for example, by treatment with dilute mineral acid, to simpler polymeric forms from aqueous solutions of which (being polydisperse), fractions of different average molecular weight can be precipitated by adding a suitable water-miscible organic liquid, such as methyl alcohol, ethyl alcohol or acetone. These degradation products consist of polymerized glucose residues, joined predominantly by $\alpha$—1:6 and, to a lesser extent, by $\alpha$—1:4 linkages.

A fraction of this kind is suitable as a starting-material for the purpose of my invention, but the molecular range of the partially depolymerized dextran is selected from the standpoint of the physical characteristics such as intrinsic viscosity, of the solution containing the minimum concentration of the dextran needed to ensure continued stability of the parenteral iron solution, rather than from the customary one of the physiological effects of the dextran itself, which are here of secondary importance.

In the present context the intended meaning of intrinsic viscosity is the limiting value of specific viscosity divided by concentration at infinite dilution measured by the followng method. The "flow time" of at least three solutions of different concentrations (all less than 5% w./v. dextran) is determined in an Ostwald viscometer. The flow time of the solution divided by the flow time for water at the same temperature, gives the relative viscosity of the composition of the invention at the given concentration. The specific viscosity of the composition of the invention at a given concentration is obtained by subtracting 1.0 from the value for relative viscosity. For each concentration of the composition of the invention, the factor (specific viscosity divided by concentration) is calculated and this factor is plotted against the percentage concentration of the solution from which it was obtained. By extrapolating the graph obtained to zero concentration, the limiting value of the factor (specific viscosity divided by concentration) is obtained. This value is known as the intrinsic viscosity of the material in the solution. Due to the fact that the fractions of dextran described are polydisperse, the term average intrinsic viscosity is used.

To avoid any possible misinterpretation, the term "average intrinsic viscosity" referes to the hydrogenated dextran itself and not to an aqueous solution of it, or an aqueous solution of its ferric hydroxide complex.

I have found that stable iron solutions can be prepared from fractions of hydrogenated dextran of intrinsic viscosity ranging from 0.03 to 0.15, and optimally 0.03 to 0.08. The iron content of the therapeutic solution of my invention should be within the range of one weight percent to twenty-five weight percent of elemental iron (corresponding to about two weight percent to fifty weight percent of ferric hydroxide). This material may be diluted down prior to usage in the high iron concentration preparations. The extent of degradation of the hydrogenated dextran should be such that it should have an intrinsic viscosity of 0.03 to 0.15, and preferably between 0.03 to 0.08. Similarly, if polymerized hydrogenated dextran is used, the same range of intrinsic viscosities should be used.

The pH of the finished therapeutic composition of my invention should be between 5.0 and 7.0, and preferably of the order of about 6.5. The preparations of the present invention when used as solutions for parenteral injection may contain as much as twenty-five weight percent of ferric iron. Normally, there is no reason for reducing the ferric iron concentration to below about one weight percent. In most conventional veterinary and human preparations, the ferric iron concentrations will be of the order of ten to fifteen weight percent when the preparation is used for parenteral injection. I have found that in preparations in which the material is used as a paste, the ferric iron concentration may be as much as thirty weight percent; and where the material is used in the dry state, the ferric iron concentration may be as much as forty weight percent.

I have found that such paste and solid materials may be used for oral ingestion, and constitute useful dietary additives for furnishing iron. The weight percentage of the hydrogenated dextran to the ferric iron in the preparations of the present invention should be between one-half of hydrogenated dextran per part of iron to two parts of hydrogenated dextran per part of iron.

The major advance wrought by the present invention lies in the discovery that if pure ferric hydroxide is formed prior to exposure with hydrogenated dextran, a much higher yield of iron hydrogenated dextran complex may be achieved, the normally required purification of the complex is not needed, and the resulting complex will possess an exceedingly low toxicity and low staining attributes.

The ferric hydroxide is formed in accordance with the present invention in an acidic solution, and is highly purified by dialysis, prior to blending with the hydrogenated dextran solution. I have discovered that if the highly purified ferric hydroxide is formed prior to the contact with the hydrogenated dextran both superior yields of the complex and a superior complex are obtained. I have found that the presence of alkali, such as sodium hydroxide, during the complex formation is both unnecessary and undesirable. Thus, the presence of alkali or other electrolytes lowers the yield of complex. Moreover, the presence of alkali or other electrolytes during complex formation requires that purification steps, such as precipitation with alcohol be added, after complex formation. Such purification is unnecessary with my process.

This is a most unexpected result in the light of the theories expressed by chemists who have considered the problem, and who have postulated a mechanism involving a chemical or quasichemical coupling. It is recognized that this form of coupling is not a suitable basis for explaining the formation of ferric hydroxide hydrogenated dextran complexes as opposed to ferric hydroxide dextran complexes, since in the former no aldehydo, keto, or carboxyl coupling is possible. Thus, unlike dextran which possesses aldehydo, keto, or carboxyl groups, the hydrogenated dextran used in my invention is non-reducing to Somogyi reagent.

Although I do not wish to be bound by any mechanism, in the light of my experience, I presently believe that the iron hydrogenated dextran complexes of the present invention constitute stable colloidal solutions, or a protective coating of one colloid upon another, such as the ferric hydroxide upon the iron hydrogenated dextran, or the iron hydrogenated dextran upon the ferric hydroxide.

The ferric hydroxide is preferably derived from an aqueous solution of ferric chloride, and ammonium hydroxide is the preferred alkaline agent. The ammonium hydroxide should be added to the ferric chloride in an aqueous solution until the pH of the order of about 2.0 is obtained. At this point, the ferric hydroxide solution which has been formed should be filtered, and then dialyzed with running distilled water until substantially free of chloride ions. This is achieved at a pH of the order of about a pH of 3.5, and preferably about 4.5 to 5.5. The thus-purified ferric hydroxide is then blended with hydrogenated dextran solution under agitation at somewhat elevated temperatures, such as of the order of 50° C. to 90° C., and preferably 75° C. to 85° C., until the iron hydrogenated complex is achieved. While a boiling temperature, or a temperature up to boiling temperature may be used, it is better to avoid the formation of the complex at such higher temperatures in order to avoid skin formation on the surface of the solution.

The purified ferric hydroxide derived by the foregoing technique is of much higher purity than the so-called "dialyzed iron" that is presently commercially available (which normally has a pH of about 2), or the "dialyzed iron" normally referred to in the literature, as the same contains a substantial amount of chloride ions and/or ammonium ions.

The dialysis of the ferric hydroxide may be achieved using conventional dialysis membranes, such as colloidin or cellophane, or using conventional dialyzing equipment.

I have found that the complex formation normally requires approximately two to five hours after initial blending, with such time period being dependent upon the temperature, size of the batch, etc. Heating for a prolonged period subsequent to the complex formation within the aforesaid temperature range serves the purpose of driving off water and concentrating the preparation.

In the process of the present invention, the normal purification steps heretofore required to form an iron hydrogenated dextran suitable for clinical use including precipitation with isopropyl alcohol, or ethyl alcohol, are unnecessary. This permits a substantial saving to be effected. For example, experience has demonstrated that to manufacture a 100 gallon batch of ten weight percent iron hydrogenated dextran, it is necessary to use approximately 4000 gallons of isopropyl alcohol to effect purification by precipitation. While a very high percentage of this isopropyl alcohol can be recovered, it requires distillation and there are substantial losses encountered. Thus, the purification step heretofore required has proven to be very costly commercially.

It sometimes happens that a parenteral iron preparation obtained by the improved process is slightly hypotonic; thus the freezing-point depression of a colloidal solution containing about five percent elemental iron, as normally prepared for intramuscular injection, is frequently less than 0.53° C. (the approximate depression obtained with isotonic saline): in such a case, a suitable amount of an appropriate substance such as sodium chloride or glucose may be added to raise the freezing-point depression value of the preparation to 0.53° C. and thereby render it substantially isotonic with blood.

As above-indicated, the pH of the therapeutic composition of the present invention should fall within the range 5.0 to 7.0. The pH may be adjusted, prior to sterilization, with acid or with alkali, so as to insure that the pH falls within these limits.

Sterilization of the preparations made in accordance with the present invention can be effected by autoclaving such preparations in their final containers, as, for example, ampoules, for thirty minutes at a steam pressure of ten pounds per square inch corresponding to a temperature of 115° C. However, it is preferable because of the desirability of avoiding the possibility of degradation of the hydrogenated dextran or precipitation of ferric oxide due to excessive heat to sterilize by filtration through Pasteur-type tubes, Millipore filters, sterilizing pads or the like.

When colloidal solutions prepared in accordance with my invention are dehydrated as, for example, by evaporation under reduced pressure or, alternatively, by the separation and subsequent desiccation of the product obtained on precipitating the colloid by adding a suitable water-miscible solvent such as methyl alcohol, ethyl alcohol or acetone, there can be obtained solidified preparations suitable for the immediate reconstitution of colloidal injectable iron solutions by the addition of distilled water.

The therapeutic compositions of the present invention satisfy the following requirements which have been established as being desirable for an iron solution intended for intramuscular injection in the treatment of iron-deficiency anemina:

(a) No effect on the pH of the body fluids;
(b) Isotonicity with the tissue fluid;
(c) Stability in presence of protein and electrolytes;
(d) Ready availability of haemoglobin synthesis;
(e) Rapid absorption coupled with a low rate of excretion;
(f) Maximal iron content in minimal volume;
(g) Low toxicity;
(h) Reproducibility;
(i) Stability on storage.

The hydrogenated dextran used in the therapeutically useful compositions of the present invention has an average intrinsic viscosity of 0.03 to 0.15 and preferably between 0.03 to 0.08. This is below the average intrinsic viscosity of the hydrogenated dextrans which have been reported in the literature, as for example in United States Letters Patent 2,807,610, issued September 24, 1957, in the name of Morris Zief and Joseph R. Stevens. Thus, the hydrogenated dextrans utilized in the subject invention are derived from dextrans having an appreciably lower average intrinsic viscosity than those disclosed in the examples of United States Letters Patent 2,807,610. Thus, while it has heretofore been proposed in United States Letters Patent 2,807,610 to hydrogenate dextrans having average molecular weights of 75,000, or average molecular weights between 50,000 to 100,000, the optimum range of dextrans used to form the hydrogenated dextrans to be used in the therapeutically useful compositions of the present invention lie in the molecular weight range of 2,000 to about 10,000, namely an average intrinsic viscosity of 0.03 to 0.08. However, notwithstanding the relatively high extent of depolymerization of the dextrans used to form the hydrogenated dextrans of the subject invention, I have determined that the procedure set forth in Example III of Patent 2,807,610 can be successfully followed with low molecular weight dextrans of the aforesaid molecular weight range to produce the hydrogenated dextrans having the aforementioned average intrinsic viscosities. The hydrogenated dextrans used in the subject invention are substantially non-reducing to the Somogyi reagent.

As illustrative of a method of preparing hydrogenated dextran useful in the therapeutically useful compositions of the present invention, I submit the following:

EXAMPLE A 200 grams of sodium borohydride dissolved in water were added to a ten percent aqueous solution containing ten pounds of dextran having an average intrinsic viscosity of 0.05. The mixture was allowed to stand at room temperature for five hours with occasional stirring, and then was acidified with thirty percent acetic acid. The acidified mixture was passed through a column of a cation exchange resin, and the effluent therefrom was passed through a column of an anion exchange resin. Methyl alcohol was added with stirring to the so-deionized solution to give a solution containing eighty percent of methyl alcohol by volume. After standing for twenty-four hours at 25° C., the supernatant solution was decanted from the precipitated reduced dextran. The product was dried at 100° C. at atmospheric pressure for one hour, then at 100° C. in vacuum for two hours. The product was non-reducing to the Somogyi reagent. It is desirable that preliminary testing be made when dealing with different batches of dextran to determine that an adequate amount of sodium borohydride is present, in the above example, the sodium borohydride is present in excess of its minimum requirement.

As a method of preparing hydrogenated dextran of the polymerized type, the following is illustrative:

EXAMPLE B

*Leuconostoc mesenteroides* NRRL B–512 was utilized to produce dextransucrase by the procedure set forth in Example 1 of Patent 2,660,551.

Such dextransucrase was utilized to form polymerized dextran from an aqueous mixture containing 80 weight percent of sucrose and 5 weight percent of low molecular weight dextran derived from a preceding run. The pH of the mixture was adjusted to 5.2 and the temperature was maintained at 25° C. until conversion of sucrose to dextran, as measured by the production of fructose, had ceased.

Dextran was then precipitated from the mixture by the addition of methyl alcohol to give a ninety percent solution. Such gummy precipitate was then made up into a five percent aqueous solution and fractionated by the progressive addition of methyl alcohol, such fractionation including four stages each with an increasing concentration of methyl alcohol, namely a methyl alcohol fractionation within the limits of % v./v. of 0–40, 40–50, 50–60, and 60–70. The dextran derived from the last two fractionations was of the order of molecular weight for usage in the preparation of ferric hydroxide-hydrogenated dextran complexes of the present invention.

The dextran derived from the last two fractionations is separated and hydrogenated in accordance with the following procedure: 200 grams of sodium borohydride dissolved in water were added to a ten percent aqueous solution containing ten pounds of the aforesaid dextran. The mixture was allowed to stand at room temperature for five hours with occasional stirring, and then was acidified with thirty percent acetic acid. The acidified mixture was passed through a column of cation exchange resin, and the effluent therefrom was passed through a column of an anion exchange resin.

Methyl alcohol was added with stirring to the so deionized solution to give a solution containing sixty percent of methyl alcohol by volume. After standing for 24 hours at 25° C. the supernatant solution was decanted from the precipitated reduced dextran. The product was dried at 100° C. at atmospheric pressure for one hour, then at 100° C. in vacuum for two hours. The resultant hydrogenated dextran was non-reducing to the Somogyi reagent.

In order to illustrate the ferric hydroxide hydrogenated dextran complexes of the present invention and their process for formation, there is presented the following examples:

*Example I*

A 15 weight percent ammonium hydroxide solution is added to a 40 weight percent ferric chloride solution (based on $FeCl_3 \cdot 6H_2O$) until the pH of about 2.0 is obtained. The resultant solution is then filtered through nylon to remove any precipitated material, and the filtrate is passed into a cellophane dialyzer tube. The cellophane dialyzer tube is then placed into running distilled water. Ammonium chloride will gradually pass out through the tube into the running distilled water. Simultaneously, the pH of the solution within the tube will rise, with the ferric hydroxide (or hydrous ferric oxide, which is herein referred to as ferric hydroxide) remaining in colloidal suspension. No precipitation of the ferric hydroxide should occur. The washing is maintained until the solution is substantially free of chloride ions. This will generally occur at a pH of about 4.5 to 5.5, which point will indicate a dialyzed ferric hydroxide solution of high purity. This ferric hydroxide solution will contain between approximately three and one-half to four weight percent of ferric ions.

A 20 weight percent hydrogenated dextran solution having a molecular weight of about 5000 and prepared pursuant to the procedure set forth in Example A was then added to the ferric hydroxide solution. The amount added was equal in terms of the weight of the hydrogenated dextran to the weight of the ferric iron. Thus, if ten parts by weight of ferric iron are contained in the colloidal solution, then ten parts by weight of hydrogenated dextran were added.

The mixture of the colloidal ferric hydroxide and hydrogenated dextran solution is then blended under agitation at 80° C. until a stable complex is achieved.

The resultant complex is then filtered.

The iron concentration is then adjusted to give an iron concentration of ten weight percent, the pH of the solution may be adjusted to 6.5, although in many cases the pH will already be in the range where it may be used as a parenteral material, the solution is filtered, and then the colloidal solution is sterilized by filtration. Alternatively, the solution may be sterilized prior to the adjustment of the pH to 6.5, if the pH is so adjusted.

In respect to the length of time required to achieve dialysis, this will vary depending upon the size and efficiency of the dialysis apparatus. With cellophane tubes, I have used a time period of some 20 hours in running distilled water. Analogously, the time period required for the agitation of the colloidal ferric hydroxide solution with the hydrogenated dextran solution to form the complex will vary depending upon the size of the batch, the extent of agitation, etc. However, for maximum yield, the agitation should be continued at 80° C. for a period of at least several hours. Yields of the order of 90 weight percent based upon the hydrogenated dextran can be achieved by the process of the present invention. Thus, only of the order of 10 weight percent of the hydrogenated dextran is wasted. In prior methods at least 50 weight percent of the hydrogenated dextran is wasted. While I do not wish to be bound by any theory, it is my present belief that in the subject process a more complete complexing between the ferric hydroxide and the hydrogenated dextran is achieved than was heretofore possible.

*Example II*

The procedure set forth in Example I was followed, except that in place of the hydrogenated dextran formed from a degradation of dextran by the procedure of Example A, the hydrogenated dextran derived by the synthetic procedure of Example B was used.

*Example III*

The procedure set forth in this example was the same as that of Example I except that the amount of hydrogenated dextran used was one-half the weight of the ferric iron in solution. A yield of the order of 90 weight percent based upon the hydrogenated dextran was obtained.

*Example IV*

The procedure set forth in this example was the same as that of Example I except that the amount of hydrogenated dextran was two times the weight of the ferric iron in solution. The procedure of this Example IV while giving a product having a low toxicity would normally not be used commercially because of the waste of hydrogenated dextran which is much more expensive than ferric iron in solution.

The therapeutic compositions of my invention are essentially free from iron ions, and therefore may be classified as nonionic. Shelf testing has revealed such compositions to be very stable on storage.

The iron hydrogenated dextran preparations of the present invention can be produced at much less cost than iron hydrogenated dextran produced by any other method presently known to me due to the high yields obtained from the present process. Moreover, the staining at the injection site is far lower with the preparations of the present invention than with any prior iron hydrogenated dextran preparation or with any iron dextran preparation known to me. Finally, the toxicity of the iron hydrogenated dextran preparations of the present invention is appreciably below that of prior preparations. Thus, the preparations of the present invention have a $LD_{50}$ value when tested for intravenous toxicity in mice of well above the order of 2000 mg./kilo. This low toxicity has not heretofore been attained or even closely approximated with any injectable iron preparation for the treatment of iron-deficiency anemia.

While I do not wish to be bound by any theory respecting the reason for the low toxicity of the iron hydrogenated dextran of the present invention, it is my belief that by forming the complex in the absence of electrolytes, such as alkali or other salts, the possibility of contamination by trace metals is eliminated. Thus, I believe that it is possible for hydrogenated dextran to entrap or possibly even complex with trace metal contaminants which may be present in the alkali or in the electrolytes. I believe that these trace metal contaminants contribute markedly to the toxicity. Thus, it is possible for arsenic to be a trace metal contaminant in iron salts. It is my present belief, although I am not completely certain thereof, that the reason why a much higher yield is obtained by the process of the present invention than was heretofore possible is that the use of highly purified ferric hydroxide to form the non-ionic colloidal ferric hydroxide-hydrogenated complex eliminates the competition heretofore present between the hydrogenated dextran and the alkali. It is my opinion that in my earlier process for forming ferric hydroxide-hydrogenated complex that there was a competition between the alkali and the hydrogenated dextran for the ferric ions, with consequent loss of hydrogenated dextran. I do not understand the mechanism for this loss, but I believe it was present.

The present invention may be embodied in other specific forms without departing from the spirit or essential attributes thereof, and, accordingly, a reference should be made to the appended claims, rather than to the foregoing specification as indicating the scope of the invention.

I claim:

1. The process of preparing a therapeutically useful substantially non-ionic colloidal ferric hydroxide-hydrogenated dextran complex which comprises blending at a temperature of the order of 50° C. to 90° C. a purified colloidal ferric hydroxide solution, which purified colloidal ferric hydroxide solution is prepared by dialyzing colloidal ferric hydroxide solution with distilled water and in which said dialysis is continued until a pH of about 3.5 to 5.5 is reached and the ferric hydroxide solution is substantially free of chloride ions, with an hydrogenated dextran having an average intrinsic viscosity at 25° C. of about 0.03 to 0.15, with said hydrogenated dextran being substantially non-reducing to Somogyi reagent, to form said complex.

2. The process of preparing a therapeutically useful substantially non-ionic colloidal ferric hydroxide-hydrogenated dextran complex which comprises blending at a temperature of the order of 50° C. to 90° C. a purified colloidal ferric hydroxide solution, which purified colloidal ferric hydroxide solution is prepared by dialyzing colloidal ferric hydroxide solution with distilled water and in which said dialysis is continued until a pH of about 3.5 to 5.5 is reached and the ferric hydroxide solution is substantially free of chloride ions, with an hydrogenated dextran having an average intrinsic viscosity at 25° C. of about 0.03 to 0.08, with said hydrogenated dextran being substantially non-reducing to Somogyi reagent, to form said complex.

3. The process in accordance with claim 1 in which the complex is formed at a temperature of between 75° C. and 85° C.

4. The process in accordance with claim 1 in which the dialysis is continued until a pH of about 4.5 to 5.5 is reached.

5. The process of preparaing a therapeutically useful substantially non-ionic colloidal ferric hydroxide-hydrogenated dextran complex which comprises blending at a temperature of the order of 50°C. to 90° C. a purified colloidal ferric hydroxide solution, which purified colloidal ferric hydroxide solution is prepared by dialyzing colloidal ferric hydroxide solution with distilled water and in which said dialysis is continued until a pH of about 4.5 to 5.5 is reached and the ferric hydroxide solution is substantially free of chloride ions, with the hydrogenated dextran having an average intrinsic viscosity at 25° C. of about 0.03 to 0.15, at a temperature of between 50° C. and 90° C., with said hydrogenated dextran being substantially non-reducing to the Somogyi reagent, to form said complex.

6. The process in accordance with claim 1 in which the iron content of the complex is such that the weight ratio of the hydrogenated dextran to elemental iron is between one-half part of hydrogenated dextran per part of iron to two parts of hydrogenated dextran per part of iron.

References Cited by the Examiner

UNITED STATES PATENTS 3,022,221 2/1962 Floramo ------------ 167—68

JULIAN S. LEVITT, *Primary Examiner.*